Inventor
Alfred D. Mosby
Attorneys.

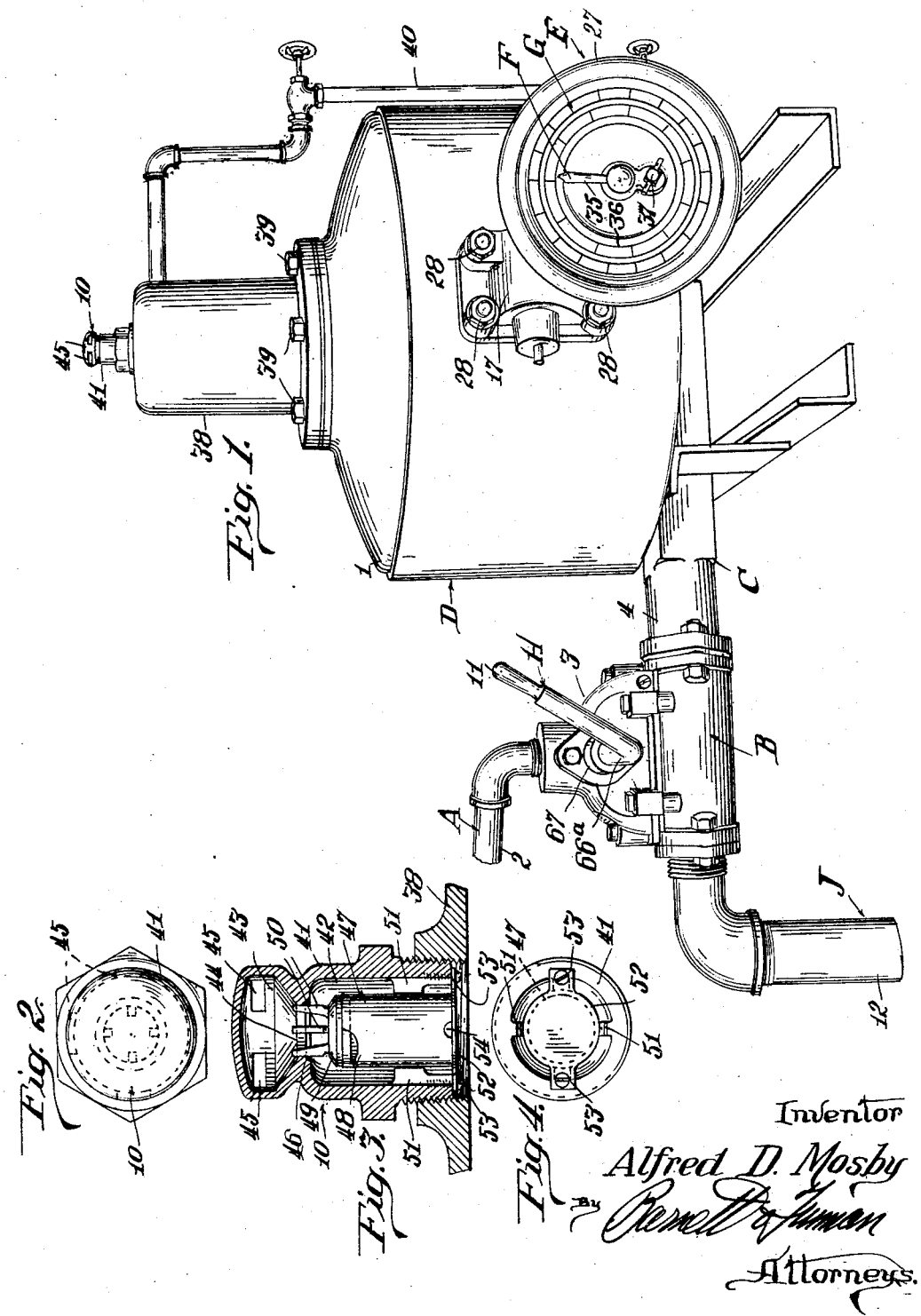

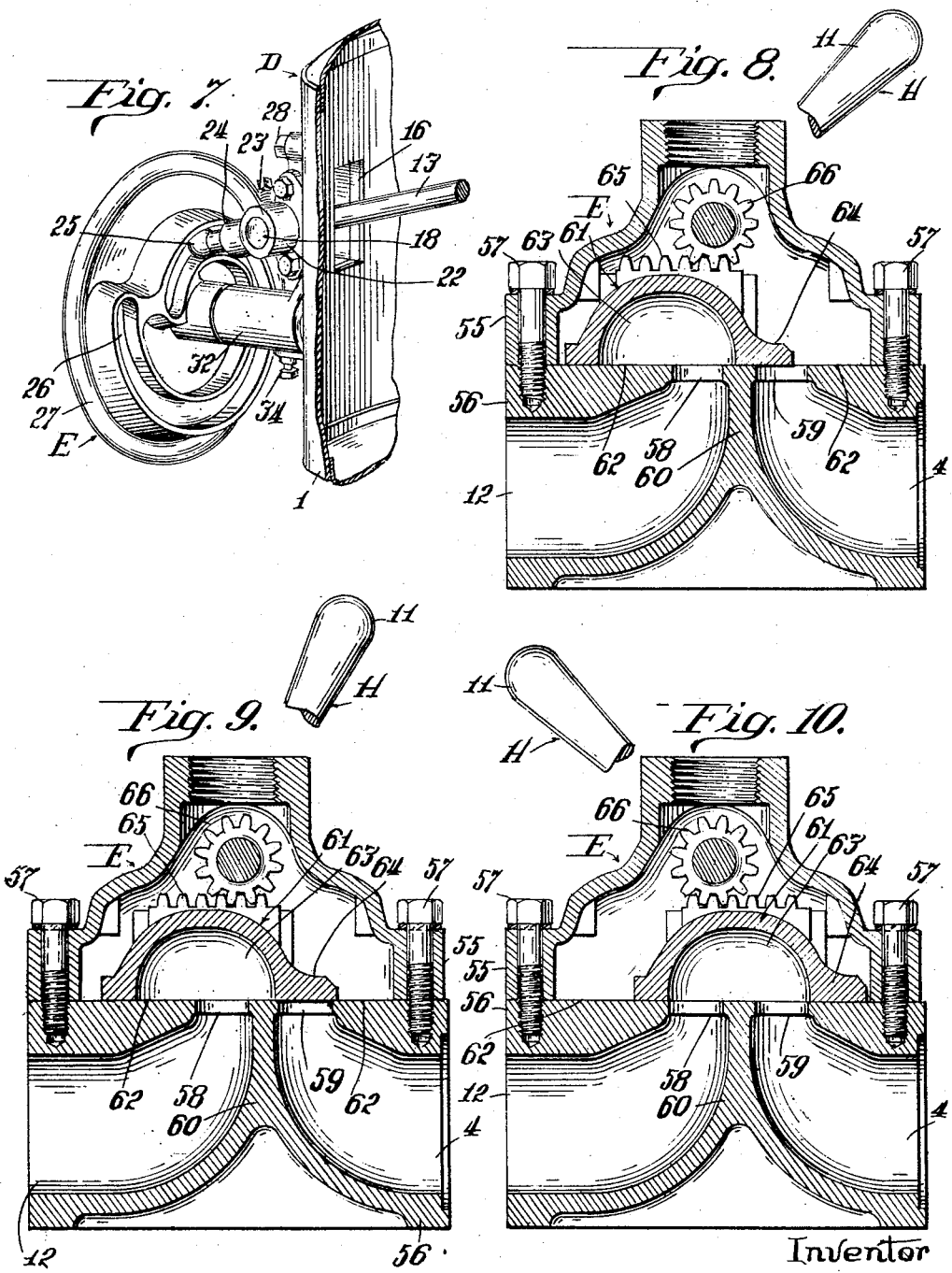

Patented Nov. 22, 1932

1,888,239

UNITED STATES PATENT OFFICE

ALFRED D. MOSBY, OF WATERLOO, IOWA, ASSIGNOR TO CONSTRUCTION MACHINERY COMPANY, OF WATERLOO, IOWA, A CORPORATION OF IOWA

MEASURING APPARATUS

Application filed August 3, 1931. Serial No. 554,744.

This invention relates to an apparatus for automatically dispensing predetermined amounts of liquid in operations wherein the amount of liquid dispensed should be controlled to a high degree of exactitude.

In many modern industrial operations it has become not only desirable but imperative to provide highly accurate measurements of liquid. In construction engineering, for example, strict regulations regarding the exact amount of liquid used in mixing operations are being rigidly enforced. The problems involved in meeting these requirements are augmented by the varied conditions under which such operations are performed. In concrete mixing, for example, the problem is not merely that of devising a measuring apparatus which will be accurate under ordinary circumstances, but one which will be unaffected by severe and continual vibration, by exposure to extreme heat or cold, by water pressures varying from practically nothing to two hundred pounds or more, by muddy or gritty water and, in short, all of the rigors to which construction machinery may be subjected. At the same time, however, the apparatus to meet these requirements must possess complete and absolute accuracy.

Convenience of operation is also a highly desirable feature in an apparatus of this nature, particularly when the apparatus is employed on heavy construction machinery. Under such circumstances the operator is often restricted by the externally moving parts of such machine to a limited area of operation. Furthermore, the movements of the operator within this limited area are also restricted by virtue of the extreme vibration and dangerous jerking motions found in many construction machines of this nature, which will tend to throw the operator off of balance. In addition to this these motions of the machine also tend to throw the operating mechanism out of adjustment. To insure rapid and safe manipulation of the regulating mechanism and immediate detection of any accidental change or error in adjustment, therefore, the operating means should be both readily accessible and in full view of the operator. To provide controlling mechanism on the top of the apparatus, for example, would, under many circumstances involve not only a waste of time but also danger to both the operator and the inspectors. Were the measuring apparatus used on a machine such as a concrete mixer, it might even be necessary to completely cease operations while making adjustments. Therefore, when the measuring apparatus is to be employed under these conditions it is imperative that the operating means be so positioned, preferably on the side of a vessel, that the operator may quickly and conveniently make adjustments and also that the operating means will be in full view at all times.

One of the objects of this invention is to provide an improved measuring tank or receptacle for water or other liquids comprising a novel arrangement of valves and controlling mechanism whereby the liquid withdrawn therefrom may be automatically and accurately gauged to any desired volume.

A further object is to provide means preferably on the side of the tank for easily and quickly setting the apparatus to deliver any desired volume of liquid, for example, in pints or pounds or fractions thereof.

A further object is to provide improved means for rapidly and efficiently controlling the flow of liquid into and out of the tank so that all danger of leaking and by-passing is obviated and any tendency to dribble eliminated.

A further object is to provide a measuring tank with unitary means of control.

A further object is to provide a measuring tank involving both simplicity and sufficient sturdiness of construction, to withstand the strain of operation on a concrete mixer, for example, without breakage or impairment of efficiency.

A further object is to provide a measuring tank of such construction that the accuracy will not be affected when the tank is tilted or tipped by virtue of operation on uneven levels of ground.

A further object is to provide a measuring tank which will efficiently operate under varied conditions of water pressure and which will not be adversely affected by muddy or gritty water.

A further object is to provide a new and improved construction of valve of the dual phase type for controlling the flow of liquid into and out of the measuring tank.

A further object is to provide a new and improved air valve which will not prematurely seat itself under conditions of high velocity of air discharging from the tank occasioned by high pressure of the liquid entering the tank but which will, however, seat itself under conditions of extremely low water pressure or even no pressure whatever.

The invention is illustrated in a preferred embodiment in the accompanying drawings, wherein:

Fig. 1 is a perspective view of the apparatus;

Fig. 2 is a plan view of the air valve.

Fig. 3 is a vertical sectional view of the air valve.

Fig. 4 is a bottom view of the air valve showing the valve supporting plate.

Fig. 7 is a detail plan view of the regulating wheel and associated parts;

Fig. 8 is a vertical sectional view of the valve for controlling the flow of water to and discharge of water from the measuring tank, this valve body being shown in this figure in the position which it occupies during the filling of the tank.

Fig. 9 is a vertical sectional view of the valve body in a closed position.

Fig. 10 is a vertical sectional view of the valve body in the position which it occupies during the withdrawal of liquid from the tank.

Figure 5:
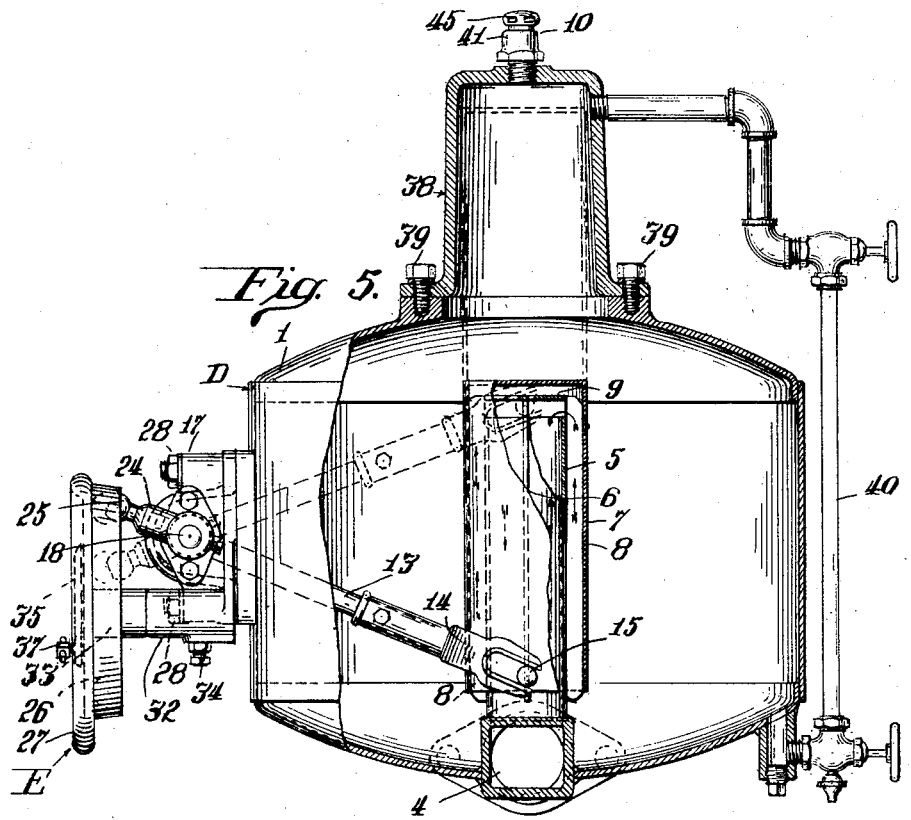
Fig. 5 is an elevation with parts broken away and parts shown in central vertical section.
Figure 6:
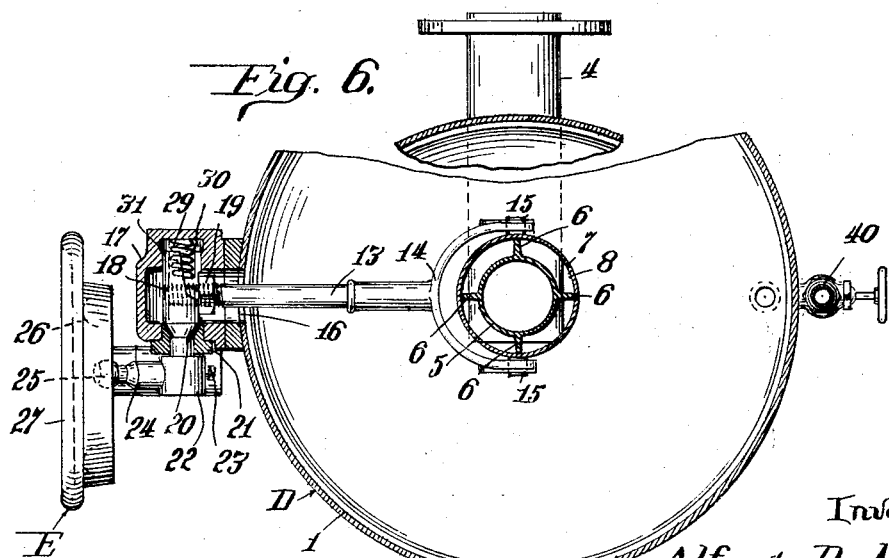
Fig. 6 is a horizontal section with parts broken away.

Before entering into a detailed description of the apparatus and to facilitate an understanding thereof, the general operation of the invention may be briefly described as follows, with reference to Fig. 1.

The liquid to be measured passes from an inlet supply pipe A, through a valve mechanism B, thence through a duct C and into a vessel or tank D. When the tank D is completely filled with liquid a regulating hand wheel E is turned until a pointer F designates on dial G the amount of liquid to be withdrawn from the tank D. As will be hereinafter described, the regulating hand wheel E operates a device within the tank which determines the level to which the liquid in the tank can subside.

The desired volume of liquid thus indicated is discharged from the tank D by operating a hand lever H which is on valve mechanism B. This operates to shut off inlet supply pipe A and open a discharge pipe J. The measured liquid is thereby discharged from tank D, into duct C, through valve mechanism B and thence through discharge pipe J to any point desired. When the measured water is completely discharged the hand lever H is operated to refill tank D.

Referring to the figures, the reference character 1 designates a vessel or tank adapted to be completely filled with liquid. An inlet supply pipe 2 communicates with tank 1 through a dual phase valve mechanism 3, hereinafter described, and an inlet and outlet duct 4 secured to the bottom portion of the tank 1. The inlet and outlet duct 4 is preferably cast with or welded to the bottom head of tank 1 and leads to an opening in the central bottom portion thereof.

Projecting upwardly into the tank 1 from the opening therein is a stationary siphon pipe 5 which is open at its upper end and is preferably welded to the bottom head of the tank to form a continuation of inlet and outlet duct 4.

Stationary siphon pipe 5 is provided with four projecting ribs 6 which serve as guides for an adjustable siphon pipe 7 which is slidably arranged thereon. The top of adjustable pipe 7 is closed and the bottom is open, thus providing a duct 8 leading from the top of stationary pipe 5 downward between the inner walls of adjustable pipe 7 and the outer walls of stationary pipe 5 into the interior of the tank 1. All liquid entering or leaving the tank 1 passes through duct 8.

The ribs or guides 6 are extended above the top of the stationary siphon pipe 5 and support a deflector plate 9 which is spaced above the upper edge of stationary siphon pipe 5 and is of greater diameter than the stationary siphon pipe 5.

To provide for the discharge of air from the tank 1 as the liquid enters through duct 8, and to stop the flow of water into the tank 1 when it is completely filled, is an air valve 10, hereinafter described, on the top of tank 1, adapted to close when the tank is completely filled.

When the tank is completely filled and it is desired to withdraw liquid from the tank, the valve handle 11 on dual phase valve mechanism 3 (Fig. 1), hereinafter described, is operated to bring inlet and outlet duct 4 into communication with a discharge pipe 12. As the liquid flows out of the stationary siphon pipe 5, the liquid is drawn upward from tank 1 through duct 8 by siphonic action. This flow of liquid out of the tank will continue until the water level within the tank recedes to the lower end of duct 8, at which time the siphonic action is broken, thus stopping the flow.

It will now be noted that the level to which the liquid in the tank can recede is dependent upon the location of the lower end of duct 8.

By raising and lowering the adjustable siphon pipe 7, the lower end of duct 8 is varied accordingly.

To provide for an external adjustment for varying the position of lower end of duct 8, adjustable siphon pipe 7 is supported on a lever 13 provided with a yoke 14, the ends of which are bifurcated for slidable engagement with stud 15 on adjustable siphon pipe 5. The opposite end of lever 13 extends through a slot 16 (Fig. 7) in tank 1 and into a casing 17 on the side of tank 1 where it is threaded into a rock shaft 18 and secured thereto by lock nut 19. Shaft 18 is journaled in casing 17 and one end thereof is reduced in diameter and formed with a conical bearing 20 which fits a correspondingly formed bearing surface on a gland 21 set into the end of the casing.

On a portion of shaft 18 which projects through the casing 17 is a collar 22 adjustably secured thereto by a set screw 23 and provided with cam stud 24 having a rounded end 25 to fit into an eccentric cam groove 26 formed in the back portion of a regulating wheel 27. By turning the regulating wheel 27, lever 13 is rocked to adjust the vertical position of the adjustable siphon pipe 7, which accordingly varies the position of the lower end of duct 8. The cam groove or grooved spiral 26 as illustrated (Fig. 7) is so constructed that the maximum adjustment is accomplished in one revolution of the regulating wheel 27. While the pitch of this groove may be varied to allow either more or less than one revolution of the regulating wheel, it has been found that in the illustrated form the intermediate points of adjustment may be accurately and clearly calibrated and the adjustments made with great rapidity.

The casing 17 is secured to the side wall of tank 1 by bolts 28 or in any other suitable manner. Rock shaft 18 is held in water sealing engagement with casing 17 by a coiled spring 29 arranged in a spring pocket 30 in the end of the rock shaft and against the end wall 31 of casing 17.

Depending from casing 17 is a socket pipe 32 with a stud shaft 33 secured thereto by set screw 34 on which the regulating wheel 27 is rotatably supported and held in position thereon by a pointer 35 which extends through an opening at the outlet end of stud shaft 33 and is rigidly secured thereto. The outside face of regulating wheel 27 is provided with a dial 36 calibrated to pints, pounds or whatever system of measurement is desired.

The lower end of pointer 35 is provided with a thumb screw 37. Thumb screw 37 extends through the lower portion of pointer 35 and is adapted to bring the hand wheel 27 and pointer 35 into locked engagement, thus preventing any movement of the regulating wheel 27 caused by accidental means or by the vibration of the mechanism upon which this invention may be used.

To provide for raising the adjustable siphon pipe 7 to a high position for the measurement of a relatively small amount of liquid, the tank 1 is provided on its top head directly over the movable siphon pipe 7 with a bonnet 38 secured to the tank by stud bolts 39 and which is adapted to receive the upper end of the adjustable siphon pipe 7 when the same is in an elevated position, as indicated by dotted lines in Fig. 5.

A gauge glass 40 communicating with the top and bottom heads respectively of tank 1 serves to indicate the level of the liquid in the tank.

The air valve 9 on the top of tank 1 to control the air leaving and entering the tank and adapted to close when the tank is completely filled may be of the ordinary commercial type of check valve, but a valve of this type is not recommended. In the practical use of this invention, on a concrete mixer, for example, the tank is subjected to various degrees of water pressure ranging from practically nothing up to 150 or 200 pounds pressure. This fluctation may even exist from hour to hour on the same job. Under such variations, the ordinary commercial type of check valve is objectionable for two reasons. First, under low or no water presure, the movable part of such valve may not seat itself when the water level in the tank reaches it, as this part is too heavy to be floated up with by the water. Usually a minimum pressure of about 10 pounds is necessary to cause the check valve to seat itself. Second, when high pressure inlet water is being used, particularly with a large inlet pipe, the flow of water is so great and fills the tank so rapidly that the air escaping from the tank moves at an extremely high velocity. The velocity of air through the air valve increases as the volume of water in the tank increases until the velocity of the air rushing through the valve is so great that it lifts the valve, causing it to seat itself prematurely. This, of course, traps a considerable amount of air in the tank, preventing it from completely filling with water. Inasmuch as the tank must be completely filled before each operation, premature seating of the valve would destroy accuracy of the apparatus.

The preferred form of air valve 6, which obviates the above difficulties, is shown in Fig. 3. Valve casing 41 is secured by an air tight connection to an aperture through the top of bonnet 38. This casing consists of a valve chamber 42 and a discharge chamber 43 which is separated by a valve port 44. The discharge chamber 43 is provided with ports 45 which communicate with the outside atmosphere. Valve port 44 is provided at its lower or valve chamber side with a valve seat 46.

Within valve chamber 42 is positioned a valve 47 comprising a float 48, a closing member 49 on the top thereof adapted to engage with valve seat 46, and rib or wing guides 50 which project from the top of closing member 49 into valve port 44 and slidably bear against the sides thereof.

The float 48 may be formed with any one of several floatable substances and may also be formed in varied shapes, but the preferred embodiment of this float 48 comprises a hollow cylinder of thin metal which is open on the lower end and secured to closing member 49 on the upper end. Float 48 is maintained in true vertical alignment by four projecting ribs 51 which are secured to walls of valve chamber 42. When the valve 47 is in an open position, as shown in Fig. 3, the lower edge of float 48 rests on a thin metal plate 52 of slightly larger diameter than that of float 48, and which is provided with ears 53 which are secured to the bottom of rib 51. The lower edge of float 48 is provided with openings 54 to prevent any sealing engagement between float 48 and plate 52.

The valve mechanism 3 for the control of liquid entering or leaving the tank is interposed between the supply pipe 2, the discharge pipe 12 and inlet and outlet duct 4. The casing of this valve mechanism is preferably in two parts, 55 and 56. Part 56 (usually the lower) is interposed directly between inlet and outlet duct 4 and discharge pipe 12. Parts 55 and 53 are held in water sealing engagement by stud bolts 57. An opening in part 56 is divided into ports 58 and 59 by partition or fitting 60. The ports 58 and 59 are alternately opened or closed by slide valve 61, which is slidably arranged on valve seat 62. Valve 61 is preferably a chilled or ground surface to insure a sliding surface which will remain tight, withstand the abrasive action of muddy or gritty water, and, at the same time operate freely.

Slide valve 61 is helmet-shaped and provides a chamber 63 of sufficient size to simultaneously cover ports 58 and 59. The base of slide valve 61 is extended on the side nearest port 59 to form a flange 64 of sufficient width to cover port 59.

On the top portion of slide valve 61 is a series of rack teeth 65. A pinion 66 adapted to mesh with rack teeth 65 is positioned on shaft 66a which projects through stuffing box 67 (Fig. 1) and is journaled in the upper portion of valve mechanism 3. The pinion is rotated by a hand operating lever 11 secured to the projecting end of shaft 66a.

While any two way valve may be used in place of the valve above described, the above construction is preferred in view of the fact that it will not permit by-passing of the liquid at the moment of opening or closing the valve. In many valves of the type which simultaneously open one port and close the other, there is a brief period when both inlet and discharge openings will be momentarily open at the same time, letting the inlet water by-pass through the valve into the measured water being discharged from the tank, thus destroying the accuracy of the measuring device. It will be noted that the preferred valve body above described, is so constructed that in order to throw the valve seat between the filling position (Fig. 8) and the discharge portion (Fig. 10) it is first necessary to go into the closed position (Fig. 9). This, as will readily be seen, obviates all danger of by-passing.

*The operation of the apparatus*

To fill the tank 1, the hand operating lever 11 is swung toward the tank into position shown in Fig. 8. This opens port 59 and allows liquid from supply pipe 2 to flow through duct 4, upward through stationary siphon pipe 5 and into the tank 1.

As the tank 1 fills with water, the air escapes through opening in valve 10. When the water level in the tank 10 rises into the valve chamber 42 of valve 10 a considerable amount of air is trapped in float 48. The weight of the water thus displaced gradually equalizes the weight of the valve 47, causing it to float and rise into valve seat 46, closing off the escape of any water bound through the valve. As no more liquid can enter the tank 1, the hand operated lever 11 of valve mechanism 3 is left in the filling position (Fig. 8).

Before the liquid is withdrawn from the tank, the operator turns the regulating wheel 27 until the pointer 35 indicates on dial 36 the amount of liquid desired. In operations where the same amount of water is required for successive batches it is, of course, unnecessary to adjust the regulating wheel after each batch, and consequently the operator may set the thumb screw 37 to prevent possible movement of wheel 27 during repeated operations.

When the desired amount of liquid is indicated on the dial 36, the operator throws operating hand lever 11 into the position shown in Fig. 10. This rotates pinion 66, which in turn moves slide valve 61 first into the closed position (Fig. 9) and then into a position wherein chamber 63 of slide valve 61 forms a by-pass between port 58 and port 59. The liquid then flows from inlet and outlet duct 4, through chamber 63 and into discharge pipe 12. When the liquid flows out of inlet and outlet duct 4 the liquid in tank 1 is siphoned upward through duct 8 over the top of stationary siphon pipe 10 and thence downward into duct 4, through the by-pass formed by chamber 63 in valve mechanism 3, and into discharge pipe 12. When the water level in tank 1 reaches the bottom of adjustable siphon pipe 7, the siphon is broken and the flow of liquid stops.

Deflector plate 9 serves to prevent liquid in the adjustable siphon pipe 7 which may be above the top of the stationary siphon pipe 5, from falling by gravity into stationary siphon pipe 5 upon the breaking of the siphon action, thus impairing the accuracy of the measuring apparatus. This feature is particularly desirable when only a small quantity of liquid is desired and the adjustable siphon pipe is in a raised position as indicated by broken lines in Fig. 5. In this position there is an appreciable quantity of liquid in the adjustable siphon pipe above the top of the stationary pipe. When the siphon action ceases this water falls by gravity onto the deflector plate 9 and thence back into the tank, thus preserving the accuracy of the apparatus.

The operator, by observing the gauge glass 40 on the side of the tank, or in most cases, by observing when the flow completely ceases in the discharge pipe, then opens the inlet valve, which simultaneously closes the discharge from the tank, permitting the tank to completely refill with water.

Although the above measuring apparatus has been described in connection with its application to the relatively rigorous operations involved in construction engineering, it is not intended to be restricted to such use. It is readily apparent that this invention may be utilized in other operations for dispensing liquid in accurate amounts wherein the apparatus is not exposed to the extreme wear and tear and varied conditions above referred to. Nor is it intended to restrict the invention to the exact constructed as described. Ordinary valves of the known commercial type may be substituted in lieu of the preferred forms above shown, equivalent types of joint may be substituted for those described and wherever a particular material is indicated it is intended to be merely descriptive and not restrictive.

I claim:

1. In a measuring device the combination of a vessel, means for filling the vessel with liquid, an outlet port, a movable element for controlling the amount of discharge of liquid from the vessel, and means for moving said element to determinate levels in the vessel, said means comprising a lever arm secured at one end to said movable element, a rock shaft engaging the other end of said lever arm, a ball end shaft projecting from said rock shaft and a regulating hand wheel outside of the tank having an eccentric cam groove on one face thereof adapted to engage said ball and shaft.

2. In a measuring device the combination of a vessel, means for filling the vessel with liquid, a siphon consisting of a stationary element and an adjustable element in telescopic relation therewith, means for discharging liquid from the vessel through the siphon, and means for raising and lowering said adjustable element to varied but determinate levels in the vessel, said means comprising a lever arm secured at one end to said movable element and secured at the other end to an operating member outside of the tank.

3. In a measuring device the combination of a vessel, means for filling the vessel with liquid, a siphon consisting of a stationary element and an adjustable element in telescopic relation therewith, means for discharging liquid from the vessel through the siphon, and means for raising and lowering said adjustable element to varied but determinate levels in the vessel, said means comprising a lever arm secured at one end to said movable element, a rock shaft engaging the other end of said lever arm, a ball end shaft projecting from said rock shaft, and a regulating hand wheel outside of the tank having an eccentric cam groove on one face thereof adapted to engage said ball end of the shaft.

4. In a measuring device the combination of a vessel, means for filling the vessel with liquid, a siphon through which the liquid is discharged from the vessel, said siphon consisting of a stationary siphon pipe and a movable siphon pipe, a lever arm secured at one end of said movable siphon pipe, a rock shaft engaging the opposite end of said lever arm, and means outside of the tank for rotating said rock shaft to raise and lower the movable siphon pipe to varied but determinate levels in the vessel.

5. In a measuring device the combination of a vessel, means for filling the vessel with liquid, an outlet port, a movable element through which liquid is directed to the outlet port, and means for moving said element to determinate levels in the vessel to control the amount of discharge from the vessel through said element, said means comprising a lever extending through a gland adjacent a wall of the vessel, one end of the lever being pivotally attached to the movable element, the other end of the lever being in operative engagement with a regulating hand wheel positioned outside the vessel.

6. In a measuring device the combination of a vessel, means for filling the vessel with liquid, an outlet port, a movable element for controlling the amount of discharge of liquid from the vessel, and means for moving said element to determinate levels in the vessel, said means comprising a lever extending through a gland adjacent a wall of the vessel, one end of the lever being pivotally attached to the movable element, the other end of the lever being in operative engagement with a regulating hand wheel positioned outside the vessel, said hand wheel having an eccentric cam groove on one face thereof adapted to engage said lever.

7. In a measuring device the combination of a vessel, means for filling the vessel with liquid, an outlet port, a movable element through which liquid is directed to the outlet port, and means for moving said element to determinate levels in the vessel for controlling the amount of discharge of liquid from the vessel through said element, said means comprising a lever arm pivotally attached at one end to said movable element, a rock shaft engaging the other end of the lever arm, said rock shaft being journaled in and extending through suitable water tight bearing means located on the side of the tank, and an operating lever projecting from the portion of the rock shaft outside the vessel.

8. In a measuring device the combination of a vessel, means for filling the vessel with liquid, an outlet port, a movable element for controlling the amount of discharge of liquid from the vessel, a lever arm pivotally secured at one end to the movable element, a rock shaft engaging the other end of the lever arm, said rock shaft extending outside of the vessel and being journaled in a water-tight casing adjacent a wall of the vessel, a ball-end lever projecting from the external portion of the rock shaft and a regulating hand wheel positioned outside the tank and adjacent a side thereof, said hand wheel having an eccentric cam groove on one face thereof adapted to engage said ball-end lever.

9. In a measuring device the combination of a vessel, means for filling the vessel with liquid, an outlet port, a movable element for controlling the amount of discharge of liquid from the vessel and through which element the liquid is directed to the outlet port, a lever arm, one end of which is pivotally attached to the movable element and the other end of which extends through an opening in the side of the tank, operating means engaging the other end of the lever arm and positioned outside the vessel, and a water tight casing secured to the outside of the vessel enclosing the outside of the opening and a portion of the operating means.

ALFRED D. MOSBY.